(12) United States Patent
Yajima et al.

(10) Patent No.: US 9,337,457 B2
(45) Date of Patent: May 10, 2016

(54) BATTERY ASSEMBLY WITH COOLING

(75) Inventors: Seijiro Yajima, Yongin-si (KR); Kwon Sohn, Yongin-si (KR); Tae-Yong Kim, Yongin-si (KR)

(73) Assignees: Samsung SDI Co., Ltd., Yongon-si (KR); Robert Bosch GmbH, Stuttgart (DE)

(*) Notice: Subject to any disclaimer, the term of this patent is extended or adjusted under 35 U.S.C. 154(b) by 621 days.

(21) Appl. No.: 12/889,119

(22) Filed: Sep. 23, 2010

(65) Prior Publication Data

US 2011/0318618 A1    Dec. 29, 2011

Related U.S. Application Data

(60) Provisional application No. 61/358,350, filed on Jun. 24, 2010.

(51) Int. Cl.
| | |
|---|---|
| *H01M 2/10* | (2006.01) |
| *H01M 10/625* | (2014.01) |
| *H01M 10/613* | (2014.01) |
| *H01M 10/647* | (2014.01) |
| *H01M 10/6551* | (2014.01) |

(Continued)

(52) U.S. Cl.
CPC .......... *H01M 2/1077* (2013.01); *H01M 10/613* (2015.04); *H01M 10/625* (2015.04); *H01M 10/647* (2015.04); *H01M 10/651* (2015.04); *H01M 10/652* (2015.04); *H01M 10/658* (2015.04); *H01M 10/6551* (2015.04); *H01M 10/6554* (2015.04); *H01M 10/6562* (2015.04); *H01M 10/6566* (2015.04); *H01M 10/6572* (2015.04)

(58) Field of Classification Search
CPC ............ H01M 10/613; H01M 10/625; H01M 10/647; H01M 10/651; H01M 10/652; H01M 10/6551; H01M 10/6554; H01M 10/6562; H01M 10/6566; H01M 10/6572; H01M 10/658; H01M 2/1077
See application file for complete search history.

(56) References Cited

U.S. PATENT DOCUMENTS

| | | |
|---|---|---|
| 5,589,290 A | 12/1996 | Klink et al. |
| 6,645,666 B1 | 11/2003 | Moores, Jr. et al. |

(Continued)

FOREIGN PATENT DOCUMENTS

| | | |
|---|---|---|
| CN | 1808752 A | 7/2006 |
| DE | 28 35 501 A1 | 2/1980 |

(Continued)

OTHER PUBLICATIONS

European Search Report dated Dec. 28, 2010, for corresponding European Patent application 10181564.5, noting listed references in this IDS.

(Continued)

*Primary Examiner* — Carlos Barcena
(74) *Attorney, Agent, or Firm* — Lewis Roca Rothgerber Christie LLP

(57) ABSTRACT

A battery assembly has a structure that can effectively cool batteries. A battery assembly according to an exemplary embodiment of the present invention includes a housing, a first battery pack in the housing, and a second battery pack in the housing, the second battery pack being spaced from the first battery pack with a first flow path therebetween, wherein a second flow path is between the battery packs and an inner surface of the housing.

17 Claims, 7 Drawing Sheets

(51) Int. Cl.
*H01M 10/652* (2014.01)
*H01M 10/6554* (2014.01)
*H01M 10/6572* (2014.01)
*H01M 10/6566* (2014.01)
*H01M 10/651* (2014.01)
*H01M 10/658* (2014.01)
*H01M 10/6562* (2014.01)

(56) References Cited

U.S. PATENT DOCUMENTS

| | | | |
|---|---|---|---|
| 7,056,616 | B2 | 6/2006 | Moores, Jr. et al. |
| 8,557,425 | B2 * | 10/2013 | Ronning et al. ............. 429/120 |
| 2006/0113965 | A1 * | 6/2006 | Jeon et al. .................... 320/150 |
| 2006/0115716 | A1 | 6/2006 | Kim et al. |
| 2006/0216581 | A1 * | 9/2006 | Hwang et al. .................. 429/99 |
| 2006/0240318 | A1 | 10/2006 | Kim et al. |
| 2007/0031728 | A1 * | 2/2007 | Lee et al. ..................... 429/120 |
| 2009/0191452 | A1 | 7/2009 | Anantharaman et al. |
| 2009/0253028 | A1 | 10/2009 | Takagi |
| 2010/0059299 | A1 | 3/2010 | Hoermandinger et al. |
| 2011/0189521 | A1 | 8/2011 | Lee et al. |
| 2011/0212354 | A1 * | 9/2011 | Nakamura ........... B60L 3/0046 429/120 |

FOREIGN PATENT DOCUMENTS

| | | |
|---|---|---|
| DE | 44 07 156 C1 | 6/1995 |
| DE | 195 03 085 A1 | 9/1996 |
| DE | 699 01 973 T2 | 3/2003 |
| DE | 10 2008 010 821 A1 | 8/2009 |
| EP | 1 753 070 A1 | 2/2007 |
| JP | 07-232564 | 9/1995 |
| JP | 11-288744 A | 10/1999 |
| JP | 2001-167806 | 6/2001 |
| JP | 2003-317812 A | 11/2003 |
| JP | 2004-071394 | 3/2004 |
| JP | 2004-311157 | 11/2004 |
| JP | 2006-156383 A | 6/2006 |
| JP | 2006-324037 A | 11/2006 |
| JP | 2006-324041 | 11/2006 |
| JP | 2008-204764 A | 9/2008 |
| JP | 2009-211829 | 9/2009 |
| JP | 2009211829 * | 9/2009 |
| JP | 2010-092854 A | 4/2010 |
| JP | 2010-123298 A | 6/2010 |
| JP | 2012-511803 A | 5/2012 |
| KR | 10-2006-0060804 A | 6/2006 |
| KR | 10-0937897 B1 | 1/2010 |
| WO | WO 2008/102228 A1 | 8/2008 |
| WO | WO 2009004928 A1 * | 1/2009 ............ B60L 3/0046 |
| WO | WO 2010/067944 A1 | 6/2010 |

OTHER PUBLICATIONS

Patent Abstracts of Japan and English machine translation of Japanese Publication 2009-211829, listed above, 10 pages.
KIPO Office Action dated Dec. 22, 2011 for KR 10-2010-0097341 (6 pages).
Machine English Translation of JP 2006-324037 A (14 pages).
European Communication dated Mar. 30, 2012, for corresponding European Patent application 10181564.5, (3 pages).
European Patent Office Action dated Sep. 8, 2011, for corresponding European application No. 10 181 564.5, 7 shts.
Japanese Office Action dated Oct. 16, 2012 of the corresponding Japanese Patent Application No. 2010-272891, noting listed references in this IDS.
Chinese Office Action, Dated Jul. 2, 2013, Issued in Chinese Patent Application No. 201010541029.2, with English Translations, 13 pages.
SIPO Office action dated May 21, 2014, with English translation for Chinese Patent application 201010541029.2, (6 pages).
Chinese Office action with English Machine Translation for Patent Application No. 201010541029.2 issued on Feb. 17, 2014, 6 pages.
EPO Summons to Attend Oral Proceedings, dated Mar. 26, 2015, for corresponding European Patent application 10181564.5, (12 pages).
English Machine translation of Japanese Publication 07-232564 dated Sep. 5, 1995, listed above, (11 pages).
English Machine translation of Japanese Publication 2001-167806 dated Jun. 22, 2001, listed above, (7 pages).
English Machine translation of Japanese Publication 2004-071394 dated Mar. 4, 2004, listed above, (14 pages).

* cited by examiner

BATTERY ASSEMBLY WITH COOLING

CROSS-REFERENCE TO RELATED APPLICATION

This application claims priority to and the benefit of U.S. Provisional Application No. 61/358,350 filed on Jun. 24, 2010, in the United States Patent and Trademark Office, the disclosure of which is incorporated herein in its entirety by reference.

BACKGROUND

1. Field

Embodiments of the present invention relate to a battery assembly with cooling.

2. Description of Related Art

A rechargeable battery differs from a primary battery in that it is designed to be repeatedly charged and discharged, while the latter typically makes only the irreversible conversion of chemical to electrical energy. Low-capacity rechargeable batteries are used as the power supply for small electronic devices, such as cellular phones, notebook computers and camcorders, while high-capacity rechargeable batteries are used as the power supply for driving motors in hybrid vehicles and the like.

In general, rechargeable batteries include an electrode assembly including a positive electrode, a negative electrode, and a separator interposed between the positive and negative electrodes, a case receiving the electrode assembly, and an electrode terminal electrically connected to the electrode assembly. In this case, the case may have a cylindrical or rectangular shape depending on the purpose of use and the usage of the rechargeable battery, and electrolyte solution is injected into the case for charging and discharging the rechargeable battery through an electrochemical reaction of the positive electrode, the negative electrode, and the electrolyte solution.

Such a rechargeable battery may be used as a battery module formed of a plurality of unit batteries coupled in series so as to be used for driving a motor of a hybrid vehicle that requires high energy density. That is, the battery module is formed by connecting an electrode terminal of each of the plurality of unit batteries in consideration of power required for motor driving such that a high power rechargeable battery can be realized.

In order to safely use the battery module, heat generated from the rechargeable battery should be efficiently emitted. If the heat emission is not sufficiently performed, a temperature variation might occur between the respective unit batteries so that the battery module cannot generate a desired amount of power for motor driving. In addition, when the internal temperature of the battery is increased due to the heat generated from the rechargeable battery, an abnormal reaction may occur therein, and thus charging and discharging performance of the rechargeable battery may be deteriorated and the life-span of the rechargeable battery may be shortened.

Recently, a high power rechargeable battery that includes a non-aqueous electrolyte having a high energy density has been developed. When the high-power rechargeable battery is configured with high capacity, the rechargeable battery is charged and discharged by high current, and the internal temperature of the rechargeable battery is increased to a significant level depending on a use state. Thus, a cooling device that can cool the rechargeable battery by effectively emitting heat generated from the battery is required.

The above information disclosed in this Background section is only for enhancement of understanding of the background of the invention and therefore it may contain information that does not form the prior art that is already known in this country to a person of ordinary skill in the art.

SUMMARY

Embodiments of the present invention provide a battery assembly that can effectively cool a battery with a simple structure.

A battery assembly according to an exemplary embodiment of the present invention includes a housing, a first battery pack in the housing, and a second battery pack in the housing, the second battery pack being spaced from the first battery pack with a first flow path therebetween, wherein a second flow path is between the battery packs and an inner surface of the housing.

The first flow path may narrow or remain the same in size in a flow direction of coolant in the first flow path.

The second flow path may widen or remain the same in size in a flow direction of coolant in the second flow path.

The housing may include a heat conductive material along the second flow path.

The heat conductive material may be selected from the group consisting of steel, stainless steel, aluminum, zinc-coated steel, and combinations thereof.

The housing may include a heat insulating material at an interface between the first and second flow paths.

The heat insulating material may include resin.

The heat insulating material may be at a location substantially aligned with the first flow path, and a width of the heat insulating material may be greater than a distance between the battery packs.

Each of the battery packs may include a battery module including a plurality of batteries and a support supporting the battery module, the support including a heat insulating material between the battery module and the second flow path.

The heat insulating material may include resin.

The battery assembly may further include one or more protrusions located in the second flow path between the inner surface of the housing and the support.

The one or more protrusions may protrude from at least one of the support or the inner surface of the housing at an oblique angle.

The one or more protrusions may be integrally formed with at least one of the support or the housing.

The battery module may further include at least one connection member for fixing the batteries to the support.

The housing may include a cooling device along the second flow path.

A cross-section of the flow paths may be nozzle-shaped or diffuser-shaped.

An electric vehicle according to another exemplary embodiment of the present invention includes a frame, a motor fixed to the frame for propelling the vehicle, and a battery assembly according to the previous embodiment, wherein the battery assembly is fixed to the frame and configured to power the motor.

A battery housing according to another exemplary embodiment of the present invention includes an outer shell, a first inner compartment, a second inner compartment, a first flow path between the first inner compartment and the second inner compartment and a second flow path between the inner compartments and an inner surface of the outer shell.

The inner compartments may include a first heat insulating material along the second flow path, and the outer shell may include a heat conductive material along the second flow path, and a second heat insulating material at an interface between the flow paths.

The outer shell may include a cooling device along the second flow path.

According to an exemplary embodiment of the present invention, the battery can be effectively cooled by generating natural convection with a simple structure rather than by equipping an additional fan.

In addition, since electrical energy is not additionally used for cooling, the use time of the battery is increased so that a driving distance of an electric vehicle can be increased.

DETAILED DESCRIPTION

Figure 1:
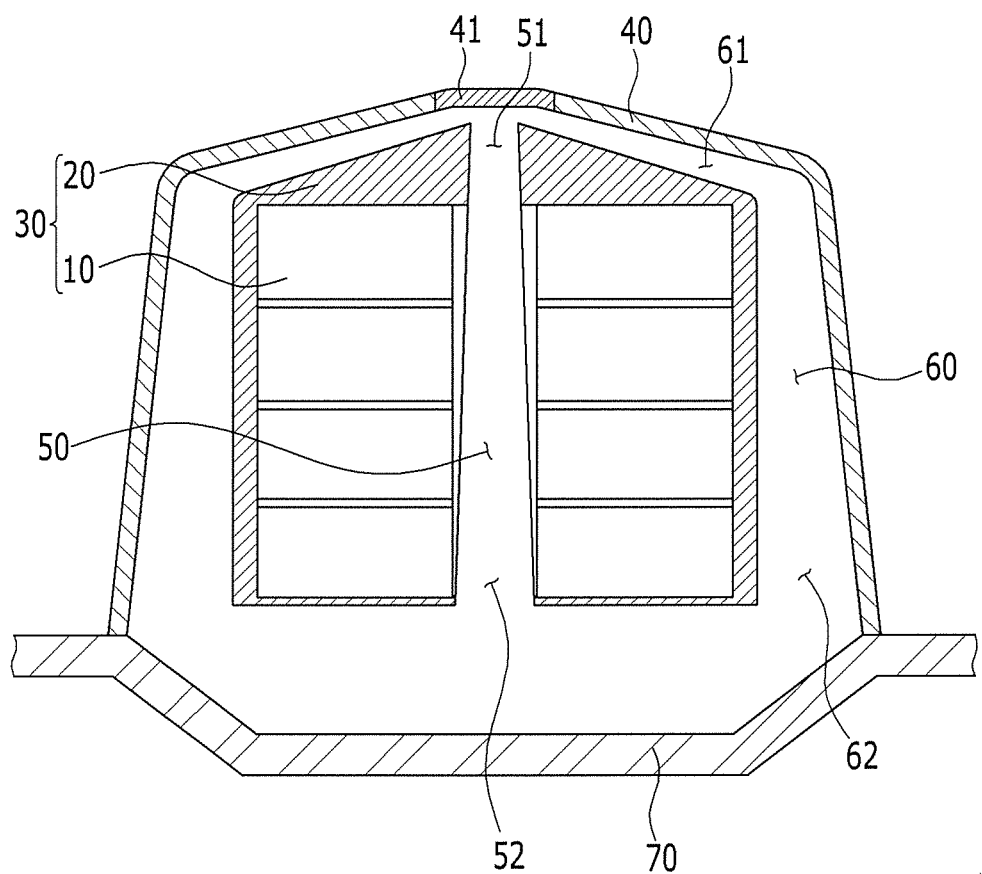
FIG. 1 is a schematic cross-sectional view of a battery assembly according to a first exemplary embodiment of the present invention.

Hereinafter, some exemplary embodiments of the present invention will be described in detail with reference to the accompanying drawings in order for those skilled in the art to be able to readily implement them. The size and thickness of each component shown in the drawings are arbitrarily shown for better understanding and ease of description, and thus the present invention is not limited to the embodiments shown in the drawings. Like reference numerals designate like elements throughout the specification and the drawings.

FIG. 1 is a cross-sectional view of a battery assembly 100 according to a first exemplary embodiment of the present invention. The battery assembly 100 has a structure for cooling batteries.

The battery assembly 100 according to the present exemplary embodiment includes a battery pack 30 and a housing 40 receiving the battery pack 30. The battery pack 30 includes at least one battery module 10 and a supporting member (or support) 20 supporting the battery module 10.

In the present exemplary embodiment, battery packs 30 provided as a pair are disposed facing each other with a gap therebetween in the housing 40 such that a first flow path 50 is formed through which a coolant can flow. In addition, the pair of battery packs 30 each has a gap (e.g., a predetermined gap) with an inner surface of the housing 40 such that there is a second flow path 60 through which the coolant can flow.

Accordingly, the coolant flows through the first and second flow paths 50 and 60 to absorb heat generated from the battery module 10 and to emit the heat to the outside to thereby cool the battery module 10. The coolant that flows through the first flow path 50 and the second flow path 60 is circulated within the battery assembly 100 by natural convection rather than by an additional device (e.g., a fan) that compulsively circulates the coolant. A mechanism that generates the natural convection will be described in further detail below.

Figure 2:
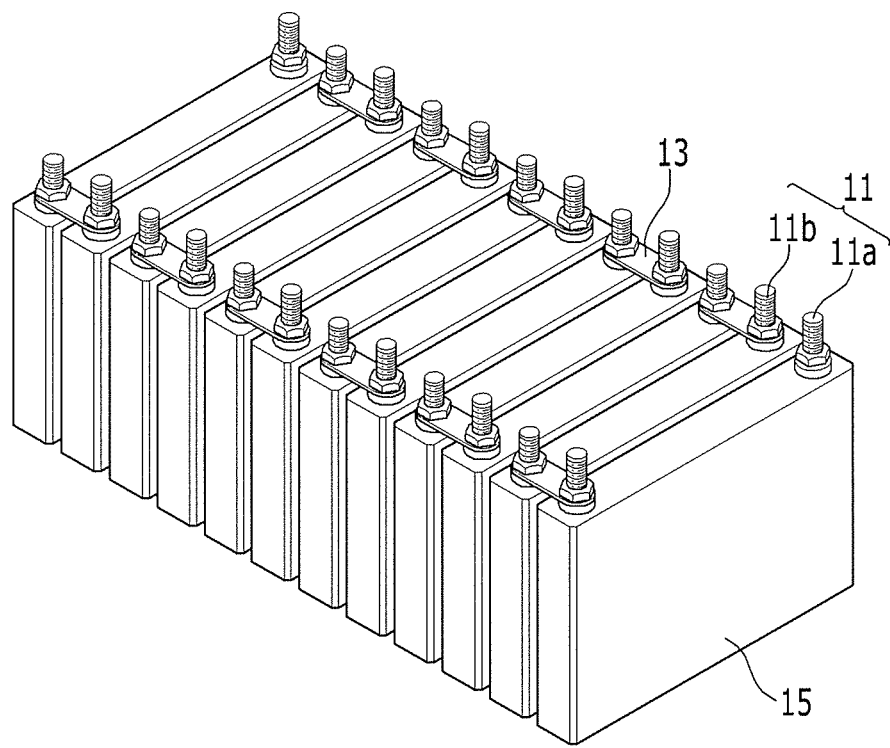
FIG. 2 is a perspective view of a battery module of the battery assembly according to the first exemplary embodiment of the present invention.
Figure 3:
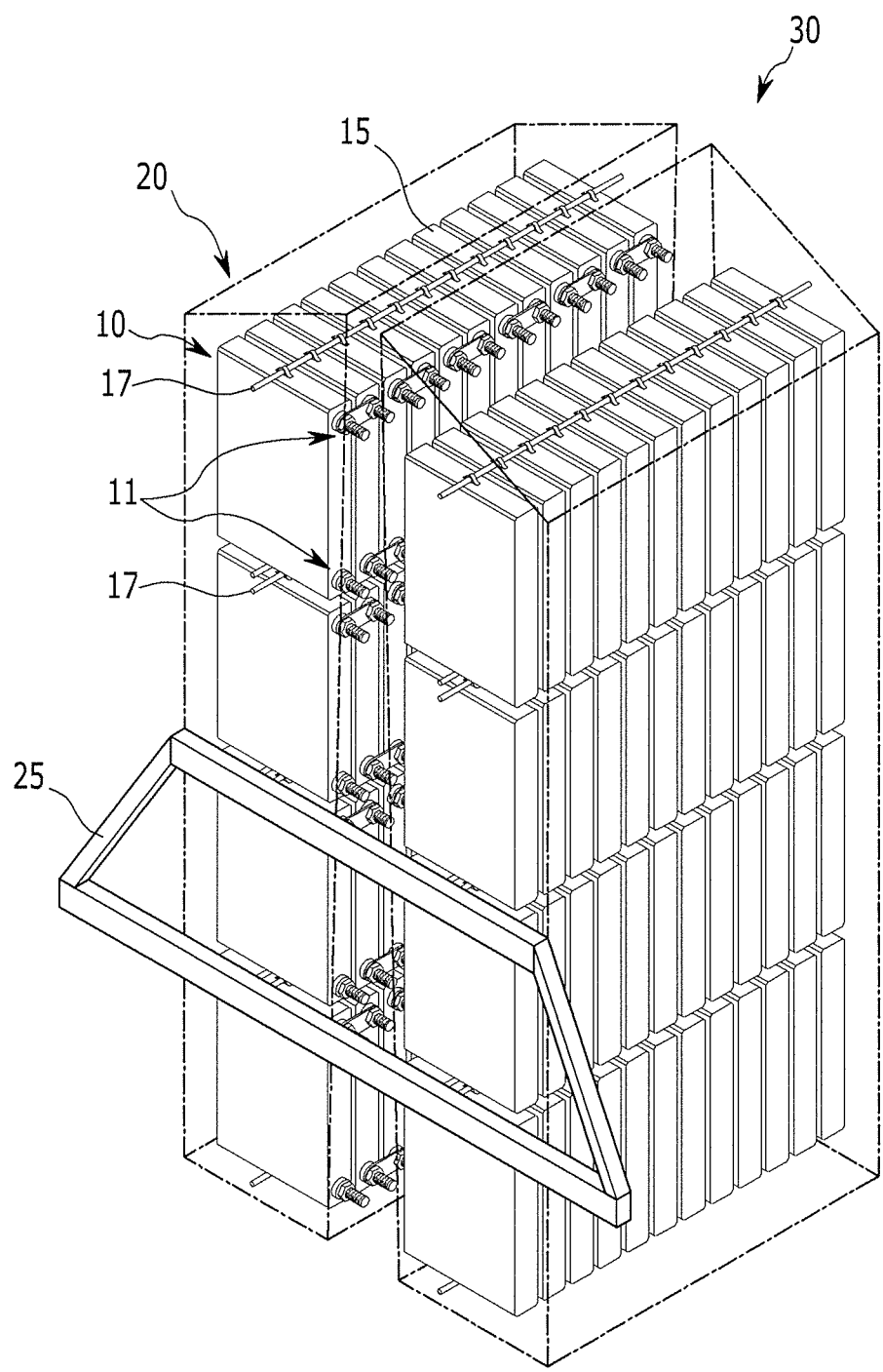
FIG. 3 is a perspective view of battery packs of the battery assembly according to the first exemplary embodiment of the present invention.

FIG. 2 is a perspective view of the battery module 10 of the battery assembly 100 according to the first exemplary embodiment of the present invention, and FIG. 3 is a perspective view of two battery packs 30 of the battery assembly 100 according to the first exemplary embodiment of the present invention. The battery pack 30 according to the present exemplary embodiment will be described in further detail with reference to FIGS. 2 and 3.

The battery module 10 of the present exemplary embodiment is formed of a plurality of unit batteries 15 coupled in series. Each unit battery 15 includes an electrode assembly including a positive electrode, a negative electrode, and a separator interposed between the positive and negative electrodes, and a case having an inner space receiving the electrode assembly. In addition, each unit battery 15 includes an electrode terminal 11 electrically connected to the electrode assembly, and the electrode terminal 11 includes a positive terminal 11a connected to the positive electrode and a negative terminal 11b connected to the negative electrode.

Electrode terminals 11 of adjacent unit batteries 15 are disposed in a crossed manner. As shown in FIG. 2, positive terminals 11a and negative terminals 11b of adjacent unit batteries 15 may be electrically connected by a bus bar 13, and accordingly, the battery module 10 is formed of a plurality of unit batteries 15 coupled in series. However, the configuration of the unit battery 15 is not limited thereto. For example, the unit battery 15 may have a structure in which an upper portion of the case can be opened and may further include a cap assembly to cover the same. In addition, the cap assembly may include an electrolyte injection hole to inject electrolyte into the case, and may further include a vent member formed to emit gas generated in the case to the outside. As described, the configuration of the unit battery 15 may be variously modified into the shapes well known to a person of ordinary skill in the art.

Referring to FIG. 3, the battery module 10 is received and supported by the supporting member 20. FIG. 3 shows a perspective view of the battery packs 30 of FIG. 1. Portions where the electrode terminals 11 of the battery module 10 are formed face each other, and as previously described, the first flow path 50 is formed therebetween.

Each battery module 10 is fixed to the supporting member 20 and stacked thereto. One or more connection members 17 for stably connecting and fixing the unit batteries 15 of the battery module 10 are extended along one or both sides of the plane where the electrode terminal 11 is formed. In this case, the connection member 17 may have a rod shape, but the present invention is not limited thereto.

Referring to FIG. 3, the connection member 17 may be fixed to the supporting member 20 by penetrating therethrough. In this case, connection between the connection member 17 and the supporting member 20 may be variously modified. For example, when the connection member 17 is formed in the rod shape, threads may be formed at both ends of the connection member 17 such that the connection member 17 can be screw engaged to the supporting member 20 using a nut.

As described, in the present exemplary embodiment, the battery module 10 can be fixed to the supporting member 20 using the connection member 17 for stable connection of the battery module 10. Thus, the battery pack 30 can be formed with a simple structure, and the battery module 10 can be stably fixed to the supporting member 20 so that misarrangement of the battery module 10 due to external impact can be prevented or reduced. Meanwhile, like the supporting member 20, the connection member 17 may be formed with a heat insulating material to prevent heat generated from the battery module 10 from being emitted to the outside (e.g., to the second flow path 60) therethrough.

Referring to FIG. 3, a fixing member 25 is installed at least one side of the supporting member 20, which is not formed second flow path 60. The at least one fixing member 25 connects and fixes the supporting member 20 to the housing 40. Meanwhile, like the supporting member 20, the at least one fixing member 25 may be formed with a heat insulating material, and be formed in various shapes.

A portion of the supporting member 20 receiving and covering the battery module 10 may be formed with a heat insulating material including a resin such as polypropylene to cause the heat generated from the battery module 10 to be transmitted primarily (e.g., only) to the coolant flowing in the first flow path 50 rather than directly transmitted to the coolant flowing in the second flow path 60. This will be described in further detail below.

In the present exemplary embodiment, one battery pack 30 includes four battery modules 10, but the present invention is not limited thereto. That is, one battery pack 30 may include at least one battery module 10 according to the purpose and use of the battery (e.g., a secondary battery).

Referring to FIG. 1, the battery assembly 100 according to the present exemplary embodiment may include a heat insulating member 41 formed in the housing 40 between the first and second flow paths 50 and 60. If the coolant is cooled by emitting the heat to the outside right after being passed through the first flow path 50, the cooled coolant may go down and flow backward through the first flow path 50. However, the heat insulating member 41 is formed between the first and second flow paths 50 and 60 to prevent the coolant from being cooled right after being passed through the first flow path 50 to thereby prevent the backward flowing of the coolant. Similar to the heat insulating member of the supporting member 20 of the battery pack 30, the heat insulating member 41 may include a resin such as polypropylene.

The housing 40 is formed of a material having high heat conductivity, such as a metal, steel, stainless steel, aluminum, zinc-coated steel, and/or combinations thereof. Thus, the heat generated from the battery module 10 is transmitted to the coolant in the first flow path 50 and then emitted to the outside through the housing 40 in the second flow path 60. In addition, the battery assembly 100 may be applied to a hybrid vehicle or an electric vehicle. In this case, as shown in FIG. 1, the housing 40 of the battery assembly 100 may be fixed to a vehicle bottom portion 70 of the vehicle, and accordingly, heat transmitted to the coolant may be emitted to the outside through the vehicle bottom portion 70.

A gap between a pair of battery packs 30 at a lower portion 52 of the first flow path 50 may be greater than or equal to a gap between a pair of battery packs 30 at an upper portion 51 of the first flow path 50. In addition, a gap between the battery pack 30 and the housing 40 at an upper portion 61 of the second flow path 60 may be equal to or smaller than a gap between the battery pack 30 and the housing 40 at a lower portion 62 of the second flow path 60.

In the present specification, the term "lower portion" and "upper portion" are respectively defined with reference to the direction of gravity, and "lower portion" implies a direction to which the force of gravity is applied and "upper portion" implies the opposite direction. In other words, the force of gravity would act to move an object in a direction from the upper portion toward the lower portion.

In the present exemplary embodiment, the battery is cooled by convection and heat conduction of the coolant. In general, convection implies that heat is transferred through a vertical movement of the fluid by the buoyant force (e.g., buoyancy), and heat conduction implies that the heat is transferred from a high-temperature area to a low-temperature area without being forced by a movement of an object. That is, in the battery assembly 100 of the present exemplary embodiment, the coolant receives the heat generated from battery module 10 and transfers the heat through convection, and the transferred heat is emitted to the outside through heat conduction such that the battery is cooled.

Figure 4:
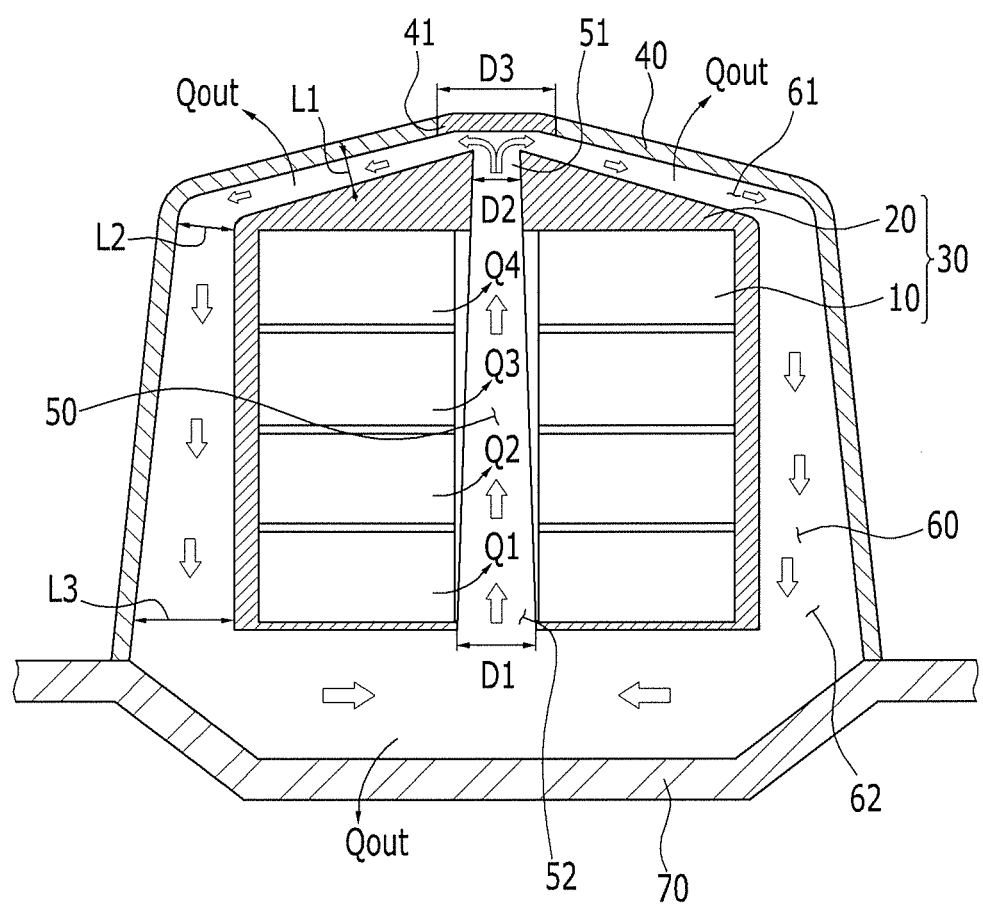
FIG. 4 is a schematic cross-sectional view of the battery assembly in the natural convection state according to the first exemplary embodiment of the present invention.

FIG. 4 shows the battery assembly 100 according to the first exemplary embodiment of the present invention in the natural convection state, and a mechanism of circulation of the coolant in the battery assembly 100 according to the present exemplary embodiment will be described in further detail.

Heats Q1, Q2, Q3, and Q4 generated from the battery module 10 are transferred to the coolant in the first flow path 50. As described above, since a portion of the supporting member 20, contacting the second flow path 60 is formed with a heat insulating material such as, for example, resin made of polypropylene or some other material, the heats Q1, Q2, Q3, and Q4 generated from the battery module 10 are not transferred to the coolant in the second flow path 60. That is, the heats Q1, Q2, Q3, and Q4 are transferred primarily (e.g., only) to the coolant in the first flow path 50. For example, gas, such as air, is used as the coolant in the present exemplary embodiment.

The heat Q1 generated from the battery module 10 is transferred to the coolant in the lower portion 52 of the first flow path 50 such that the temperature of the coolant is increased and the density of the coolant is decreased, and accordingly the buoyant force is generated from the coolant, and thus the coolant moves upward along the first flow path 50. While the coolant moves upward along the first flow path 50, the heats Q2, Q3, and Q4 generated from the upper portion of battery module 10 are transferred (e.g., sequentially transferred) to the coolant, and accordingly, the coolant continuously moves upward to the upper portion 51 of the first flow path 50.

As described above, in the first flow path 50, a gap D1 between one pair of battery packs 30 in the lower portion 52 is equal to or greater than a gap D2 between one pair of battery packs 30 in the upper portion 51. In further detail, a gap between one pair of battery packs 30 is gradually narrowed from the lower portion 52 to the upper portion 51 of the first flow path 50 according to the present exemplary embodiment.

That is, since the first flow path 50 of the present exemplary embodiment has a cross-sectional shape of a nozzle, the coolant moves upward by temperature increase of the coolant, and the flowing speed of the coolant is increased by the nozzle effect so that the coolant can more easily flow.

In addition, in each of the battery modules 10 in a pair of battery packs 30, planes where the electrode terminals 11 are formed are arranged to face each other so that the heats Q1, Q2, Q3, and Q4 generated from the battery module 10 can be effectively transferred to the coolant flowing in the first flow path 50 through the electrode terminal 11 and the bus bar 13 of the battery module 10.

As described, the coolant moved upward along the first flow path 50 reaches the housing 40, and with reference to FIG. 4, the coolant flows to the second path 60 formed between the battery pack 30 and the housing 40.

The housing 40 may further include the heat insulating material 41 formed between the first and second flow paths 50 and 60. As described above, the heat insulating member 41 functions to prevent counterflow of the coolant by preventing the coolant, of which the temperature is increased while flowing through the first flow path 50, from being cooled. The heat insulating material may include resin.

After passing through the heat insulating material 41, the coolant is cooled as the heat is emitted to the outside by the housing 40 such that the temperature of the coolant is decreased. Thus, the coolant moved out from the first flow path 50 moves to the lower portion of the battery assembly 100 along the second flow path 60 by the inertia (e.g., inertial momentum) moving in the first flow path 50 and by gravity as the coolant is passed by the heat insulating material 41 and then cooled by the housing 40. The heat insulating material is at a location substantially aligned with the first flow path, and a width of the heat insulating material may be greater than a distance between the battery packs 30.

In the present exemplary embodiment, as shown in FIG. 4, a cross-section width D3 of the heat insulating material 41 is set to be greater than the gap D2 between the pair of battery packs in the upper portion 51 of the first flow path 50. With such a structure, cooling of the coolant moved upward along the first flow path 50 can be effectively prevented or substantially prevented by the heat insulating member 41 such that the counterflow of the coolant to the first flow path 50 can be prevented or substantially prevented.

The coolant passed through the first flow path 50 passes by the heat insulating material 41 and is cooled by being in contact with the housing 40 while flowing along the second flow path 60. The second flow path 60 is formed between the housing 40 and the battery pack 30. The housing 40 is formed of a material having high heat conductivity such as, for example, a metal made of steel, stainless steel, aluminum, zinc-coated steel, and/or combinations thereof, and the portion of the supporting member 20 of the battery pack 30 contacting the coolant in the second flow path 60 is formed of a heat insulating material such as, for example, polypropylene or resin. In addition, the outside of the housing 40 maintains a room temperature since it is connected to (e.g., interfaces with) the atmosphere. Thus, while the coolant flows through the second flow path 60, the heat is emitted to the outside through the housing 40, and accordingly, the temperature of the coolant is decreased and the density thereof is increased such that the coolant moves from the upper portion 61 of the second flow path 60 to the lower portion 62 thereof.

As described above, in the second flow path 60, a gap L1 between the housing 40 and the battery pack 30 in the upper portion 61 is smaller than or equal to a gap L3 between the housing 40 and the battery pack 30 in the lower portion 62. In further detail, the gap between the housing 40 and the battery pack 30 of the present exemplary embodiment is formed to be gradually widened from the upper portion 61 of the second flow path 60 to the lower portion 62 thereof as shown by L1, L2, and L3 of FIG. 4. As described, the second flow path 60 has a cross-sectional shape of a diffuser so that the flowing speed of the coolant can be decreased, and accordingly heat radiation of the coolant can be further reliably performed by the housing 40.

Through the above-described process, the coolant passed through the second flow path 60 moves toward the lower portion of the battery assembly 100. The battery assembly 100 may be fixed to an upper portion of, for example, a vehicle bottom portion 70 of a vehicle (e.g., a hybrid vehicle or electric vehicle). In this case, with the above-described structure, additional heat radiation of the coolant can be performed through the vehicle bottom portion 70.

As shown in FIG. 4, the coolant moved down to the lower portion of the battery assembly 100 moves upward again by the rising air stream formed in the first flow path 50 and by the heats Q1, Q2, Q3, and Q4 that are continuously generated from the battery module 10, and accordingly, it circulates again in the battery assembly 100 along the first and second flow paths 50 and 60.

As described, the battery assembly 100 according to the present exemplary embodiment is formed to be able to generate the natural convection so that it can cool the battery with a simple structure without using a device such as a fan for compulsive convection. In addition, when the cross-section of the flow path of the coolant is formed in a nozzle or diffuser shape, the natural convection can be smoothly performed and heat can be sufficiently emitted to the outside so that the battery can be effectively cooled. Further, the heat insulating material 41 is additionally formed between the first and second flow paths 50 and 60 to effectively prevent the counterflow of the coolant.

Hereinafter, other exemplary embodiments of the present invention will be described with reference to FIG. 5 and FIG. 6. In the exemplary embodiments, the same construction as the first exemplary embodiment is simply described or a description thereof is omitted.

Figure 5:
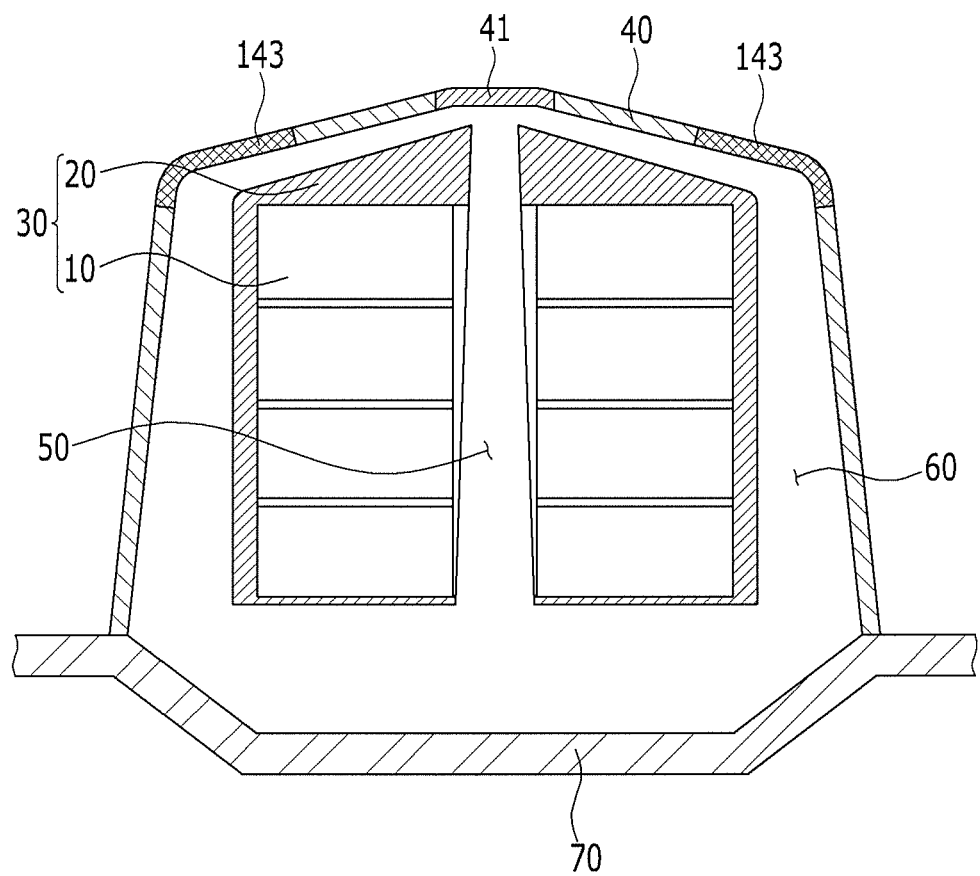
FIG. 5 is a schematic cross-sectional view of a battery assembly according to a second exemplary embodiment of the present invention.

FIG. 5 is a schematic cross-sectional view of a battery assembly 101 according to a second exemplary embodiment of the present invention. Similar to the battery assembly 100 of the first exemplary embodiment, the battery assembly 101 according to the present exemplary embodiment includes a battery pack 30 and a housing 40 receiving the same. Further, the battery pack 30 includes at least one battery module 10 and a supporting member (e.g., support) 20 supporting the battery module 10. Similar to the battery assembly 100, the battery assembly 101 has a structure for cooling batteries (e.g., unit batteries 15).

A pair of battery packs 30 is arranged so the battery packs 30 face each other in the housing 40 with a gap therebetween so that a first flow path 50 through which a coolant can flow is formed in the gap. In addition, the pair of battery packs 30 has a gap (e.g., a predetermined gap) with an inner surface of the housing 40 so that a second flow path 60 through which the coolant can flow is formed in the gap.

A heat insulating member 41 is formed between the first flow path 50 and the second flow path 60 to prevent the coolant from being cooled to thereby block or prevent the counterflow of the coolant passed through the first flow path 50 back to the first flow path 50.

As shown in FIG. 5, the battery assembly 101 according to the present exemplary embodiment further includes one or more cooling members 143 formed at both sides of an upper portion of the housing 40. The cooling member 143 cools the coolant flowing in the second flow path 60. The coolant can be more quickly cooled because the heat can be radiated by the housing 40 and cooled by the cooling member 143 as well while flowing through the second flow path 60. The cooling member 143 may be operated using a Peltier device (e.g., a thermoelectric converter (TEC)), although other cooling devices may be used as well.

As described, in the present exemplary embodiment, since the coolant is rapidly cooled using the cooling member 143, the coolant, of which density is rapidly increased, moves quickly along the second flow path 60 so that the circulation of the coolant can be smoothly performed. With such a structure, the coolant circulates in the battery assembly 101 without installing an additional circulation device therein so that heat generated from the battery module 10 can be emitted to the outside.

Figure 6:
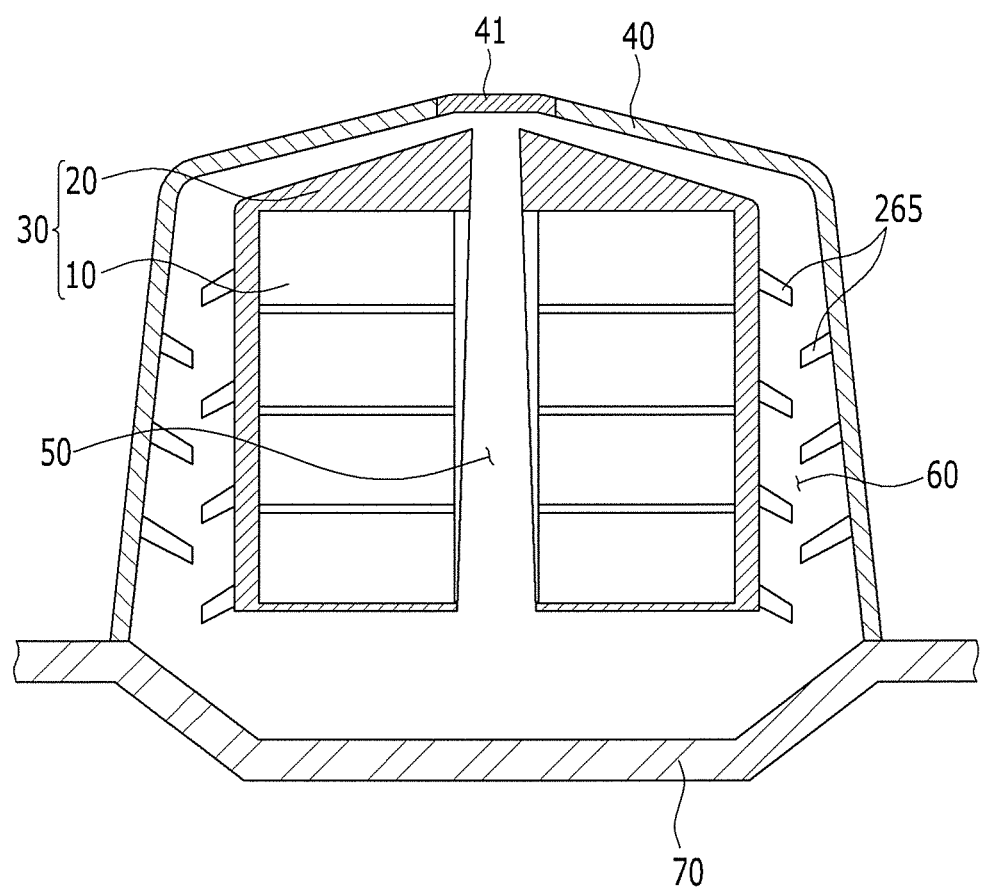
FIG. 6 is a schematic cross-sectional view of a battery assembly according to a third exemplary embodiment of the present invention.

FIG. 6 is a schematic cross-sectional view of a battery assembly 102 according to a third exemplary embodiment of the present invention. Referring to FIG. 6, similar to the battery assembly 100 of the first exemplary embodiment, the battery assembly 102 according to the third exemplary embodiment includes a battery pack 30 and a housing 40 receiving the battery pack 30. In addition, the battery pack 30 includes at least one battery module 10 and a supporting member 20 supporting the battery module 10. The battery assembly 102 also has a structure for cooling batteries (e.g., unit batteries 15).

A pair of battery packs 30 is arranged so the battery packs 30 face each other in the housing 40 with a gap therebetween so that a first flow path 50 through which a coolant can flow is formed in the gap. In addition, the pair of battery packs 30 has a gap (e.g., a predetermined gap) with an inner surface of the housing 40 so that a second flow path 60 through which the coolant can flow is formed in the gap.

A heat insulating member 41 is formed between the first flow path 50 and the second flow path 60 to prevent or substantially prevent the coolant from being prematurely cooled to thereby reduce or prevent the counterflow of the coolant passed through the first flow path 50 to the first flow path 50.

Meanwhile, the battery assembly 102 according to the present exemplary embodiment further includes one or more counterflow blocking protrusions 265 formed in the second flow path 60 to reduce or prevent counterflow of the coolant. The counterflow blocking protrusions 265 obliquely protrude to a direction toward a lower portion of the second flow path 60. Referring to FIG. 6, the counterflow blocking protrusions 265 may include a first protrusion 265 protruding from the supporting member 20 of the battery pack 30 and a second protrusion 265 protruding from the housing 40, and the first and second protrusions may respectively be integrally formed with the supporting member 20 and the housing 40.

The counterflow blocking protrusions 265 guide the coolant flowing along the second flow path 60 to flow toward the lower portion 62 (shown in FIGS. 1 and 4) of the second flow path 60 to prevent or substantially prevent the counterflow of the coolant for smooth circulation of the coolant by convection. With such a structure, the coolant circulates in the battery assembly 102 without installing an additional circulation device therein so that heat generated from the battery module 10 can be emitted to the outside.

In further embodiments of the present invention, the battery assembly 102 of the embodiment shown in FIG. 6 may additionally include one or more cooling members 143 like those of the battery assembly 101 shown in FIG. 5, or the battery assembly 101 of the embodiment shown in FIG. 5 may additionally include one or more counterflow blocking protrusions 265 like those of the battery assembly 102 shown in FIG. 6.

Figure 7:
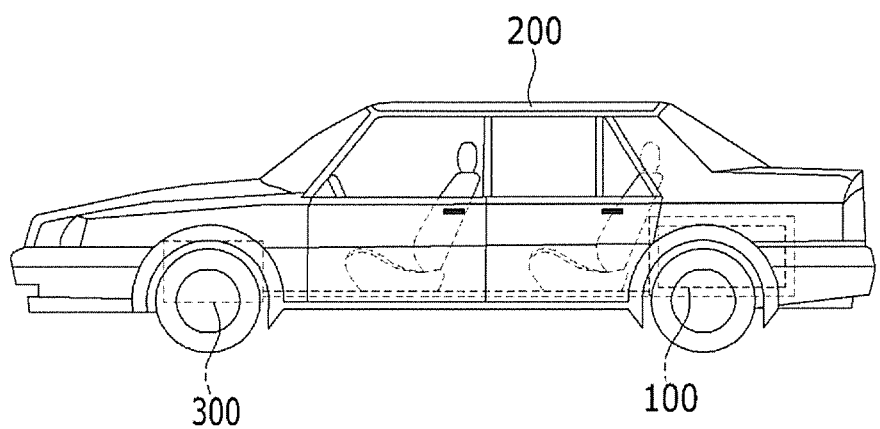
FIG. 7 is a schematic view of a battery assembly applied to a vehicle according to an exemplary embodiment of the present invention.

FIG. 7 is a schematic view of a battery assembly 100 applied to (or installed in) a vehicle 200 according to an exemplary embodiment of the present invention. In other embodiments, the battery assemblies 101 or 102 may also be installed in a vehicle 200.

Referring to FIG. 7, a battery assembly 100 according to an exemplary embodiment of the present invention may be located in a trunk of a vehicle 200 having an electric motor 300 that is powered by the battery packs 30 (shown in FIG. 1). That is, a lower portion of the battery assembly 100 is located on a vehicle bottom portion 70 of the vehicle 200 exposed to the atmosphere, and a housing 40 of the battery assembly 100 may be located in a trunk maintaining room temperature. Accordingly, a coolant circulating in the battery assembly 100 can emit heat into the trunk through the housing 40 of the battery assembly 100, and additional heat radiation to the convection can be performed through the vehicle bottom portion 70 of the vehicle 200.

FIG. 7 exemplarily illustrates that the battery assemblies 100, 101, 102 according to the exemplary embodiments of the present invention may be applied to a vehicle 200, although the present invention is not limited thereto. That is, the battery assembly 100, 101, 102 can be located in other positions in the vehicle 200, or may be applied to other apparatuses or devices using a high-capacity rechargeable battery.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and their equivalents.

DESCRIPTION OF SOME OF THE REFERENCE NUMERALS

| | |
|---|---|
| 10: battery module | 11: electrode terminal |
| 13: bus bar | 15: unit battery |
| 17: connection member | 20: supporting member |
| 30: battery pack | 40: housing |
| 41: heat insulating material | 50: first flow path |
| 60: second flow path | 70: vehicle bottom portion |
| 100, 101, 102: battery assembly | 143: cooling member |
| 265: counterflow blocking protrusion | 200: vehicle |
| 300: motor | |

What is claimed is:

1. A battery assembly comprising:
   a housing having a top, sides, and a bottom;
   a first battery pack in the housing; and
   a second battery pack in the housing, the second battery pack being spaced from the first battery pack with a first flow path therebetween,
   wherein a second flow path is between the battery packs and an inner surface of the housing,
   wherein either the first flow path gradually narrows, or the second flow path gradually widens, in a flow direction of coolant to enable natural convection,
   wherein the housing and the battery packs are adapted for the coolant to circulate between the first and second flow paths, and
   wherein a distance between an upper surface of the first or second battery pack and the inner surface of the top of the housing is smaller near a center of the housing than near an edge of the housing.

2. The battery assembly of claim 1, wherein, when the second flow path gradually widens, the first flow path remains the same in size in the flow direction of coolant in the first flow path.

3. The battery assembly of claim 1, wherein, when the first flow path gradually narrows, the second flow path remains the same in size in the flow direction of coolant in the second flow path.

4. The battery assembly of claim 1, wherein the housing comprises a heat conductive material along the second flow path.

5. The battery assembly of claim 4, wherein the heat conductive material is selected from the group consisting of steel, stainless steel, aluminum, zinc-coated steel, and combinations thereof.

6. The battery assembly of claim 4, wherein the housing comprises a heat insulating material at an interface between the first and second flow paths.

7. The battery assembly of claim 6, wherein the heat insulating material comprises resin.

8. The battery assembly of claim 6, wherein the heat insulating material is at a location substantially aligned with the first flow path, and a width of the heat insulating material is greater than a distance between the battery packs.

9. The battery assembly of claim 1, wherein each of the battery packs comprises a battery module comprising a plurality of batteries and a support supporting the battery module, the support comprising a heat insulating material between the battery module and the second flow path.

10. The battery assembly of claim 9, wherein the heat insulating material comprises resin.

11. The battery assembly of claim 9, further comprising one or more protrusions located in the second flow path between the inner surface of the housing and the support.

12. The battery assembly of claim 11, wherein the one or more protrusions protrude from at least one of the support or the inner surface of the housing at an oblique angle.

13. The battery assembly of claim 12, wherein the one or more protrusions are integrally formed with at least one of the support or the housing.

14. The battery assembly of claim 9, wherein the battery module further comprises at least one connection member for fixing the batteries to the support.

15. The battery assembly of claim 1, wherein the housing comprises a cooling device along the second flow path.

16. The battery assembly of claim 1, wherein a cross-section of the flow paths is nozzle-shaped or diffuser-shaped.

17. An electric vehicle comprising:
   a frame;
   a motor fixed to the frame for propelling the vehicle; and
   the battery assembly according to claim 1, wherein the battery assembly is fixed to the frame and configured to power the motor.

* * * * *